(12) United States Patent
Dotan-Cohen et al.

(10) Patent No.: US 10,136,290 B2
(45) Date of Patent: Nov. 20, 2018

(54) SIGNAL SHARING BETWEEN TRUSTED GROUPS OF DEVICES

(71) Applicant: MICROSOFT TECHNOLOGY LICENSING, LLC, Redmond, WA (US)

(72) Inventors: Dikla Dotan-Cohen, Herzliya (IL); Sagi Hilleli, Rishon Lezion (IL); Jonathan Rabin, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/625,786

(22) Filed: Jun. 16, 2017

(65) Prior Publication Data

US 2018/0302739 A1    Oct. 18, 2018

Related U.S. Application Data

(60) Provisional application No. 62/485,707, filed on Apr. 14, 2017.

(51) Int. Cl.
*H04W 4/80*  (2018.01)
*H04W 4/08*  (2009.01)
*H04W 88/00*  (2009.01)

(52) U.S. Cl.
CPC .............. *H04W 4/80* (2018.02); *H04W 4/08* (2013.01); *H04W 88/005* (2013.01)

(58) Field of Classification Search
CPC .................. H04W 4/008; H04W 4/80
See application file for complete search history.

(56) References Cited

U.S. PATENT DOCUMENTS

| 8,355,711 B2 | 1/2013 | Heins et al. |
| 8,694,597 B1 | 4/2014 | Raj et al. |

(Continued)

FOREIGN PATENT DOCUMENTS

EP      3035721 A1    6/2016

OTHER PUBLICATIONS

Santhi, et al., "A Framework for Energy Efficient Collaborative Video Download and Sharing in Cloud Environment", In International Journal of Computer Applications, vol. 116, No. 8, Apr. 2015, pp. 31-34.

(Continued)

*Primary Examiner* — Tuan H Nguyen
(74) *Attorney, Agent, or Firm* — Shook, Hardy and Bacon, L.L.P.

(57) ABSTRACT

Aspects of the technology described herein identify a trusted group of devices that collaborate to minimize device limitations (e.g., data use, bandwidth, battery life, and the like). Personal assistant services or cloud-based services utilize user data (e.g., web browsing, calendar entries, communication data, social networks, and the like) and device data (e.g., location data, Bluetooth beacons, Wi-Fi, and the like) provided by user devices to identify devices in the trusted group of devices. A handshake between the devices establishes a means of communication and a selected topology. A hub device is selected from the trusted group of devices to upload or download relevant data based on the selected topology. The hub device shares the relevant data with the member devices via the established means of communication.

20 Claims, 4 Drawing Sheets

(56) References Cited

U.S. PATENT DOCUMENTS

| | | | |
|---|---|---|---|
| 9,100,431 B2 | 8/2015 | Oliphant et al. | |
| 9,298,494 B2 | 3/2016 | Gathala et al. | |
| 9,326,236 B2 * | 4/2016 | Ligman | H04W 52/0209 |
| 9,407,755 B1 | 8/2016 | Koller et al. | |
| 2006/0042846 A1 * | 3/2006 | Kojori | G05B 9/03 |
| | | | 180/65.8 |
| 2007/0294692 A1 | 12/2007 | Zhao et al. | |
| 2008/0165701 A1 | 7/2008 | Ananthanarayanan et al. | |
| 2009/0258641 A1 | 10/2009 | Yaqub et al. | |
| 2013/0012220 A1 | 1/2013 | Waris et al. | |
| 2013/0121194 A1 | 5/2013 | Heshmati | |
| 2014/0380046 A1 | 12/2014 | Poomachandran et al. | |
| 2015/0304369 A1 | 10/2015 | Sandholm et al. | |
| 2017/0311359 A1 * | 10/2017 | Cho | H04W 76/10 |

OTHER PUBLICATIONS

Mtibaa, et al., "Towards Resource Sharing in Mobile Device Clouds: Power Balancing Across Mobile Devices", In Proceedings of the second ACM SIGCOMM workshop on Mobile cloud computing, Aug. 12, 2013, pp. 51-56.

"International Search Report & Written Opinion Issued in PCT Application No. PCT/US2018/026153", dated Jul. 13, 2018, 11 Pages.

* cited by examiner

SIGNAL SHARING BETWEEN TRUSTED GROUPS OF DEVICES

CROSS REFERENCE TO RELATED APPLICATIONS

This application claims the benefit of U.S. Provisional Application No. 62/485,707, titled SIGNAL SHARING BETWEEN TRUSTED GROUPS OF DEVICES, filed Apr. 14, 2017, which is hereby expressly incorporated by reference in its entirety.

BACKGROUND

Most users carry a single mobile device, which is often constrained by battery life and data limitations. These constraints may impede the user experience, as significant data may not be downloaded to the device (e.g., emails) or uploaded from the device (e.g. location signals to improve digital assistance capabilities). Many online services rely on information about a user and/or a user device to provide a service to the user. For example, a traffic notification service needs to know the user's location to provide a commute estimate along with relevant traffic information. An online personal assistant may require calendar information and/or data from email to help the user complete one or more tasks on time. Client devices have enormous amounts of information about the user's activities that could be communicated to the service at any given time. However, the wireless transfer of information uses available battery power and can consume a user's data plan.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the technology described herein identify a trusted group of devices that collaborate to minimize device limitations (e.g., data use, bandwidth, battery life, and the like). Personal assistant services or cloud-based services utilize user data (e.g., web browsing, calendar entries, communication data, social networks, and the like) and device data (e.g., location data, Bluetooth beacons, Wi-Fi, and the like) provided by user devices to identify devices in the trusted group of devices. A handshake between the devices establishes a means of communication and a selected topology (i.e., a type of data each device in the trusted group of devices has selected to share with the group). A hub device is selected from the trusted group of devices to upload or download relevant data based on the selected topology. The hub device shares the relevant data with the member devices (i.e., devices in the group of devices that are not the hub device) via the established means of communication. In this way, data use, bandwidth, and battery life for the member devices as well as resources at the source are conserved.

BRIEF DESCRIPTION OF THE DRAWINGS

The technology described herein is illustrated by way of example and not limitation in the accompanying figures in which like reference numerals indicate similar elements and in which.

DETAILED DESCRIPTION

The various technology described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for identifying a group of devices that collaborate to share a selected topology. By way of example and not limitation, personal assistant services can utilize user device and/or device data to identify devices in the group of devices. A handshake between the devices establishes a means of communication and a selected topology. Upon selected a hub device, the hub device uploads and/or downloads relevant data and shares the relevant data with member devices.

There currently exists conventional means for a user to share their location or other data that many online services use to provide a more personalized user experience. For example, a user can provide GPS information or update a webpage with their location. However, the conventional means have certain advantages and disadvantages. One limitation, for example, is that it may be difficult for the user to constantly transmit the user's location in real time. By continuously sending location data, a user device (used to transmit the location) can expend a lot of power, which can drain the battery of the device quickly.

Similarly, conventional means for receiving data from online services consume resources including data (in the user's data plan), bandwidth, and battery life. Often, users in a group attempt to download the same data at the same time. In addition to consuming each individual's device and plan resources, resources of the source of the data are also consumed. Because of delays that may result at the source, the problem of resources at each device being consumed may be exacerbated even further.

Recently, close proximity radio transmission technologies, including wireless local area network (WLAN), Bluetooth, near-field communication (NFC), ZigBee, etc. have been incorporated into user devices (such as smart phones, wearables tablets, and other portable computing devices), which allow these devices to communicate with other devices in close proximity. Data can be communicated between devices using a low energy signal, which allows a user device to transmit or receive data without significantly draining the battery of the user device. For example, a Bluetooth low energy beacon can be used.

Accordingly, systems, methods, and computer-readable storage media are provided for identifying a trusted group of devices that collaborate to minimize device limitations (e.g., data use, bandwidth, battery life, and the like). Personal assistant services or cloud-based services utilize user data (e.g., web browsing, calendar entries, communication data, social networks, and the like) and device data (e.g., location data, Bluetooth beacons, Wi-Fi, and the like) provided by user devices to identify devices in the trusted group of devices. A handshake between the devices establishes a means of communication and a selected topology (i.e., a type of data each device in the trusted group of devices has selected to share with the group). A hub device is selected from the trusted group of devices to upload or download relevant data based on the selected topology. The hub device shares the relevant data with the member devices (i.e., devices in the group of devices that are not the hub device) via the established means of communication. In this way, data use, bandwidth, and battery life for the member devices as well as resources at the source are conserved.

While data of all sorts may be described as being transferred between the hub device and one or more member devices, it should be noted that all such transfers may be subject to various privacy settings the user has selected to share or protect certain information from being disclosed to other devices in the group. Aspects the technology described herein are not dependent on transferring or having the ability to transfer all the different types of information described. Privacy settings and other considerations can be implemented to define what types of information the technology described herein can share. It should also be noted, that the online service can take steps, not described herein, to protect any data received from or transferred to the hub device.

Having briefly described an overview of aspects of the technology described herein, an exemplary operating environment in which aspects of the technology described herein may be implemented is described below in order to provide a general context for various aspects. Referring to the figures in general and initially to FIG. 1 in particular, an exemplary operating environment for implementing technology described herein is shown and designated generally as exemplary operating environment 100. The exemplary operating environment 100 is but one example of a suitable computing environment and is not intended to suggest any limitation as to the scope of use or functionality of aspects of the technology described herein. Neither should the exemplary operating environment 100 be interpreted as having any dependency or requirement relating to any one component nor any combination of components illustrated.

Figure 1:
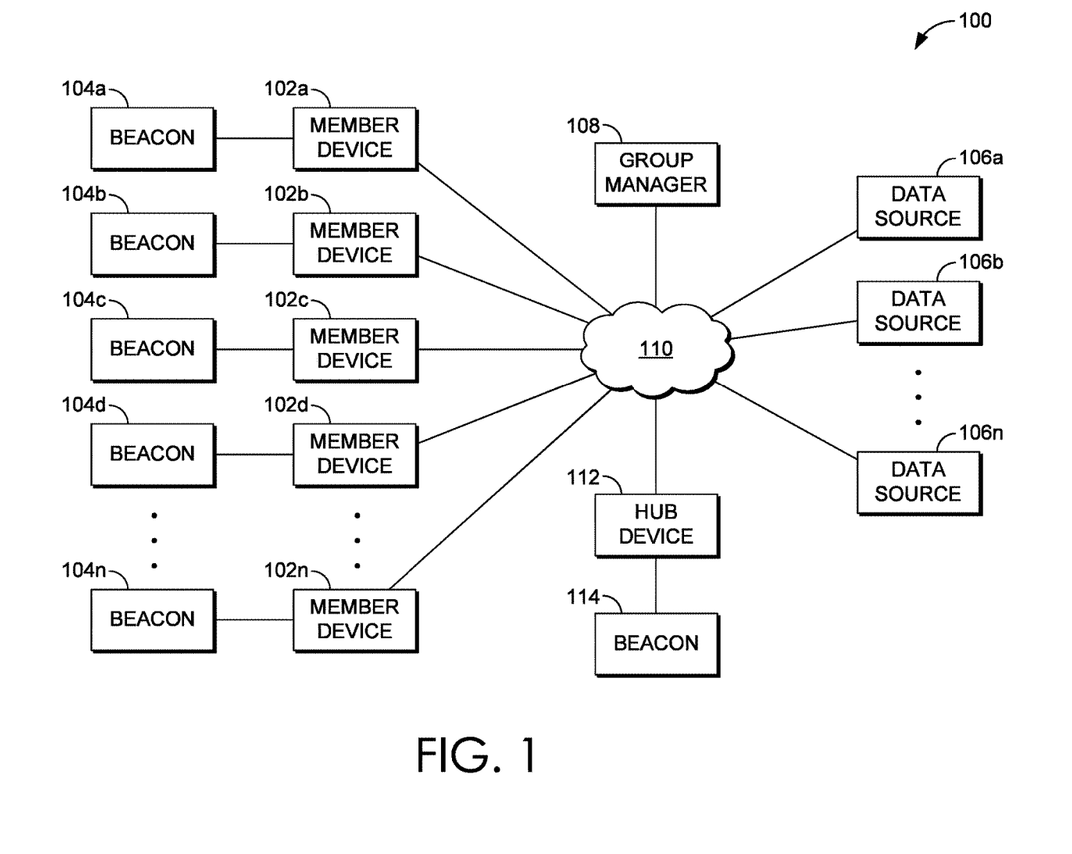
FIG. 1 is a block diagram of an example operating environment suitable for implementations of the present disclosure.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of member devices, such as member devices 102*a*-102*e*, each member having a corresponding beacon 104*a*-104*e*; a number of data sources, such as data sources 106*a*-106*n*; group manager 108; network 110; hub device 112 having a corresponding beacon 114; and group manager 108. It should be understood that environment 100 shown in FIG. 1 is an example of one suitable operating environment. Each of the components shown in FIG. 1 may be implemented via any type of computing device, such as computing device 500 described in connection to FIG. 5, for example. These components may communicate with each other via network 110, which may include, without limitation, one or more local area networks (LANs) and/or wide area networks (WANs). In exemplary implementations, network 110 comprises the Internet, a cellular network, and/or close proximity radio transmission technologies, including wireless local area network (WLAN), Bluetooth, near-field communication (NFC), ZigBee, etc., amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, group manager 108 may be provided via multiple devices arranged in a distributed environment that collectively provide the functionality described herein. Alternatively, the functionality provided by group manager 108 may instead be provided by personal assistant services running locally on member devices 102*a*-102*e* and hub device 112. Additionally, other components not shown may also be included within the distributed environment.

Member devices 102*a*-102*n* and hub device 112 may comprise any type of computing device capable of use by a user. For example, in one aspect, member devices 102*a*-102*n* and hub device 112 may be the type of computing device described in relation to FIG. 5 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Although member devices 102*a*-102*e* are illustrated as member devices and hub device 112 is illustrated as hub device, a member device can replace the hub device and the hub device may be demoted to a member device. For example, if at any point in time, group manager 108 identifies that the current hub device is no longer the device with the most battery life and/or the best signal, the hub device may be replaced by a member device that has the most battery life and/or the best signal. Other factors may be considered by group manager 108 different including user data or device data corresponding to any of the member devices 102*a*-102*e* and/or the hub device 112.

Beacons 104a-104e corresponding to member devices 102a-102e and beacon 114 corresponding to hub device 112 may comprise any type of transmitter configured to broadcast a signal to any one of member devices 102a-102e and/or hub device 112. For example, beacons 104a-104e and 114 can be a Bluetooth low energy beacon and broadcast a Bluetooth low energy signal to member devices 102a-102e and/or hub device 114. Beacons 104a-104e and 114 can also receive a Bluetooth low energy signal broadcasted from another device, such as member devices 102a-102e and/or hub device 112.

Group manager 108 may identify a group of devices (e.g., member devices 102a-102e and hub device 112) having a communication path initiated by a handshake. The handshake may be provided by personal assistant services or an application. The handshake may be provided by a social network that has connected users of the group of devices. The handshake may be provided by a public or private network that is accessible to and utilized by the group of devices. The handshake may be provided by beacons (e.g., beacons 104a-104e and 114) corresponding to each device of the group of devices.

In some embodiments, the group manager 108 may identify the group of devices using location signals that indicate the devices are moving together. In some embodiments, the group manager 108 may identify the group of devices by location signals that indicate the devices have exceeded a threshold of time being in proximity to each other. Group manager 108 may identify the group of devices based on user data or device data corresponding to the group of devices. User data may include social graph data, application data, event data, contextual data, or user signals. In some embodiments, the group manager 108 identifies the group of devices based on attempts by the devices to access or download the same data from one of the data sources 106-106n.

Data sources 106a-106n may comprise data sources and/or data systems, which are configured to make data available to any of the various constituents of operating environment 100, or system 200 described in connection to FIG. 2. Data sources 106a-106n may reside on a server and be accessible by the hub device 112 over the Internet. For example, data sources 106a-106n may provide web pages, pictures, videos, or other types of files that can be retrieved by a hub device 112 and provided to member devices 102a-102n.

Figure 2:
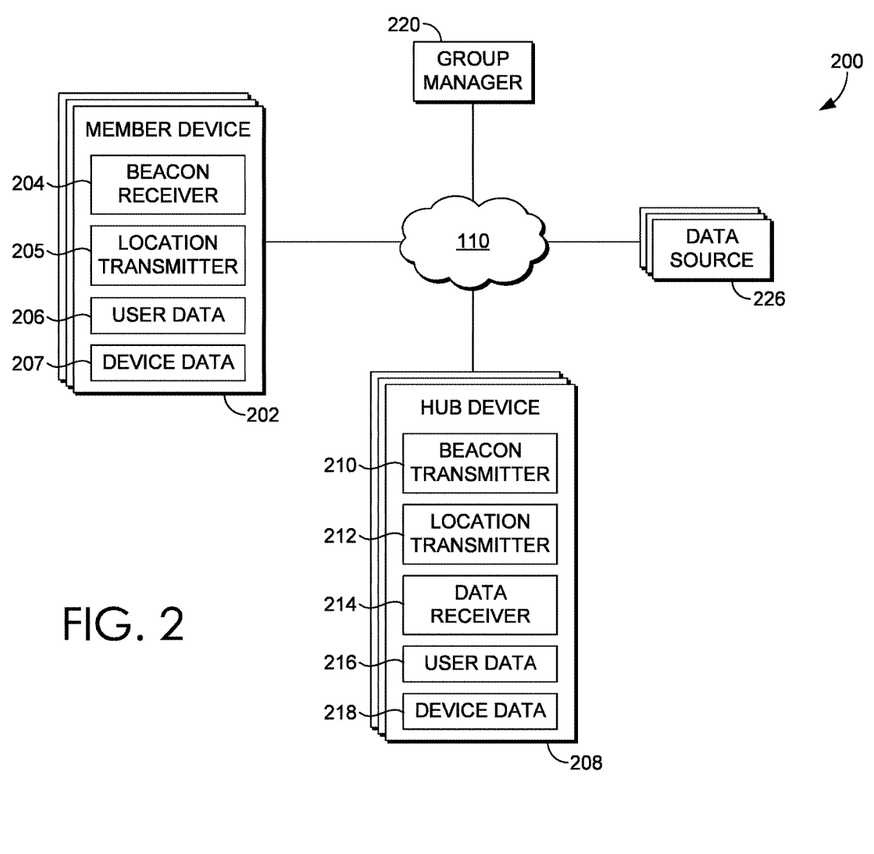
FIG. 2 is a diagram depicting an example computing architecture suitable for implementing aspects of the present disclosure.

Operating environment 100 can be utilized to implement one or more of the components of system 200, described in FIG. 2, including components for identifying a group of devices, determining a hub device, enabling the hub device to retrieve a type of data from data sources, and enabling the hub device to share the type of data with the member devices. Operating environment 100 also can be utilized for implementing aspects of methods 300 and 400 in FIGS. 3 and 4, respectively.

Referring now to FIG. 2, a block diagram is provided showing aspects of an example computing system architecture suitable for implementing an embodiment and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location. Example system 200 includes network 110, which is described in connection to FIG. 1, and which communicatively couples components of system 200 including one or more member device(s) 202, one or more hub device(s) 208, one or more data source(s) 216, and group manager 216, and one or more member device(s) 260. Subcomponents of member device(s) 202 (including beacon receiver 204, location transmitter 205, user data 206, and device data 207), subcomponents of hub device(s) 208 (including beacon transmitter 210, location transmitter 212), data receiver 214, user data 216, and device data 218), group manager 220, and data source 216 may be embodied as a set of compiled computer instructions or functions, program modules, computer software services, or an arrangement of processes carried out on one or more computer systems, such as computing device 500 described in connection to FIG. 5, for example.

In one embodiment, the functions performed by components of system 200 are associated with one or more personal assistant applications, services, or routines. In particular, such applications, services, or routines may operate on one or more member devices (such as member devices 102a-102e), hub device 112, or server (such as group manager 108), may be distributed across one or more user devices and servers, or be implemented in the cloud. Moreover, in some embodiments, these components of system 200 (including group manager 220) may be distributed across a network, including one or more servers (such as group manager 108) and/or devices (such as member devices 102a-102e or hub device 112), in the cloud, or may reside on a user device, such as member devices 102a-102e or hub device 112. Moreover, these components, functions performed by these components, or services carried out by these components may be implemented at appropriate abstraction layer(s) such as the operating system layer, application layer, hardware layer, etc., of the computing system(s).

Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, group manager 220 is generally responsible for identifying a group of devices. In some embodiments, group manager 220 identifies the group of devices based on locations signals. For example, the location signals may indicate the devices are moving together. Or, the location signals may indicate the devices have exceeded a threshold of time of being in proximity with each other. In either example, the based on the location signals, the group manager 220 may infer that the users corresponding to each device are connected. In other embodiments, communications between users of the devices may be utilized by the group manager 220 to infer that the users corresponding to each device are connected. For example, communications may include electronic mail messages, meeting invitations or requests, calendar data, or application data. Based on content found in the communications, the group manager 220 may infer that the users corresponding to each device are connected Accordingly, group manager 220 identifies the devices corresponding to the user as a group of devices.

In some embodiments, group manager 220 provides a graphical user interface, e.g., a dashboard, for the user to define a type of data that can be shared with devices in the group of devices. This may be the only type of data shared between the devices. In some embodiments, a handshake between the devices defines the type of data being shared as well as a communication path for sharing the type of data. The handshake may be provided by beacons corresponding to each device in the group of devices. Alternatively, the handshake may be provided by a personal assistant service running on each device of the group of devices. In another embodiment, a social graph, location signals, a calendar entry, an event, or a user signal may define the type of data each device shares with other devices in the group of devices.

Furthermore, in some embodiments, a machine learning component (not pictured) may help the group manager 220 identify the group of devices, the type of data being shared between the devices, or the communication path for sharing the type of data. It should be understood that the foregoing examples are for illustrative purposes, and other means of identifying a group of devices, defining a type of data being shared, and a communication path for sharing the type of data can also be envisioned. For example, a group of devices can be based on the user belonging to a group or organization and users belonging to the group or organization being in proximity with each other.

Hub device 208 includes beacon transmitter 210, data receiver 214 (explained in more detail below) user data 206 (explained in more detail below), and device data (explained in more detail below). Beacon transmitter 210 is utilized to communicate the type of data to member device(s) 202. In some embodiments, the type of data is sent via a Bluetooth low energy beacon. One advantage of a Bluetooth low energy beacon is that the beacon consumes little energy, allowing the type of data to be sent without draining the battery of hub device 208. Furthermore, since a Bluetooth low energy beacon does not require a handshake, such as a handshake between traditional Bluetooth devices, any device can receive the type of data.

Member device(s) 202 includes beacon receiver 204, location transmitter 206, user data 206 (explained in more detail below), and device data (explained in more detail below). As mentioned with respect to hub device 208, beacon receiver 204 is utilized to receive the type of data from the hub device 208. In some embodiments, the type of data is received via a Bluetooth low energy beacon. One advantage of a Bluetooth low energy beacon is that the beacon consumes little energy, allowing the type of data to be received without draining the battery of member device(s) 202. Furthermore, since a Bluetooth low energy beacon does not require a handshake, such as a handshake between traditional Bluetooth devices, any device can receive the type of data.

Although hub device 208 and member device(s) 202 are described separately, it should be understood that hub device 208 can be replaced by a member device 202 based on the group manager 220 determining that the member device 202 replacing the hub device 208 has more available resources at a particular point in time. For example, if the current hub device 208 loses battery power (or loses signal strength) such that a particular member device 202 is more suited to download the type of data and provide it to the other member device(s) 202, the particular member device 202 becomes the hub device and the current hub device 208 becomes a member device. In this way, the device of the group of devices with the most available resources at any given point in time can be the hub device and the other devices in the group of devices can be member devices. Accordingly, although not shown, each member device has a beacon transmitter and a data receiver, and each hub device has a beacon receiver.

Example system 200 includes network 110, which is described in connection to FIG. 1, and which communicatively couples components of system 200, including member device(s) 202, hub device(s) 208, group manager 220, and data source 216, may be embodied as a set of compiled computer instructions or functions, program modules, computer software services, or an arrangement of processes carried out on one or more computer systems, such as computing device 500 described in connection to FIG. 5, for example.

In one embodiment, the functions performed by components of system 200 are associated with one or more personal assistant applications, services, or routines. In particular, such applications, services, or routines may operate on one or more member devices (such as member device(s) 102a-102e), hub device (such as hub device 112), servers (such as group manager 108), may be distributed across one or more member devices and servers, or be implemented in the cloud. Moreover, in some embodiments, these components of system 200 may be distributed across a network, including one or more servers (such as group manager 108) and member device(s) (such as member device(s) 102a-102e), hub device (such as hub device 112, or in the cloud. Moreover, these components, functions performed by these components, or services carried out by these components may be implemented at appropriate abstraction layer(s) such as the operating system layer, application layer, hardware layer, etc., of the computing system(s).

Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Aspects of the technology identify a group of devices and/or determine what type of data is shared between the group of devices. To do so, user data 206, 214 and/or device data 207, 218 can be collected by a group manager 220 or a personal assistant or some other data collection component on the member device 202 or hub device 208. The group manager 220 may identify users that are in a group based on the user data and/or device data 207, 218. Additionally, or alternatively, the group manager 220 may determine what type of data the users in the group are sharing based on the user data and/or device data 207, 218.

Exemplary user data 206, 214 includes email data, email metadata, location data, text message data, social network data, calendar data, application data, search data, browsing data, and purchase data. Aspects of the technology described herein are not limited for use with this data. Other contextual data, including data records derived from this data could be used similarly. Drive data includes any data that is output from an analysis of signal data to make an inference or direct observation about a user's activities. For example, physiological data and location data could be combined to infer that the user is exercising with other users in a group of users. As another example, location data and purchase data could be combined to infer that the user is watching a particular movie at the present time in a specific theater with other users in a group of users. Such inferences can be made on a member device or hub device and used by group manager 220 to identify the group of users.

Email data can include the text of emails received on the member device(s) 202 and/or hub device 208 to one or more applications. The emails could be associated with one or more user accounts. In addition, the other recipients and center of the email can be identified in the email records. Other information about the email, such as the time sent and received can be included in the email data.

Email metadata can include information about the email records. The email metadata can include snippets of email text that are relevant for a particular purpose. For example, a heuristic or natural language processing system could identify text within an email message that is relevant to one or more events and/or groups the user is associated with. The text could also include requests of the user and promises made by the user. Such requests and promises or commitments can be used to populate a shadow calendar, a task list, or otherwise generate event data for a user that may identify when, where, and/or with whom the user will be with that may assist the group manager 220 in identifying the user will be with a group (and the user device will be in a group of devices). Further, the content of the email may indicate a type of data that will be shared between the group of devices.

Location data is a type of device data 207, 218 and can be gathered by GPS or some other technology on the client device. Location data indicates where the user, or at least the user device is located and may help identify devices in a group or a location that may indicate what type of data can be shared (e.g., work environment, conference, home environment, school, and the like).

Text data can comprise similar information as was described previously with reference to the email data and the email metadata, except the text data is related to text messages sent and received by the user. The text data can include the content of a text as well as sender and recipient information. As with emails, insights derived from analyzing a text message may identify when, where, and/or with whom the user will be with that may assist the group manager 220 in identifying the user will be with a group (and the user device will be in a group of devices). Further, the content of the text data may indicate a type of data that will be shared between the group of devices.

Social network data can include information about social posts made to one or more social networks or platforms. The information can include information about social post read by a user, received by a user from a follower, and indications or invitations made about a social post by the user. For example, the social network data can include likes, dislikes, forwards, and other interactions with social network data and social posts. The addition or subtraction of individuals from the user's social networks can also be noted within the social network data. Any or all of these items may indicate other users the user may be in a group with or what types of data the user may be interested in sharing with the group.

Calendar data can comprise information from one or more user calendars, such as office calendars, personal calendars, social media calendars, or even calendars from family members or friends of the user, in some instances. In particular, the calendar may be used for determining when an event will occur and whether information related to the event may include other users such that the user may be in a group with the other users or what types of data the user may be interested in sharing with the group.

In an embodiment, a social network profile (e.g., social network posts, social network messages, a user profile indicating hobbies or interest of the users, etc.) may be evaluated to identify an activity of the user where the user is likely to be with a group. In another example, a context of the user's device may be evaluated to identify an activity of the user (e.g., a device location may be indicative of the user going to a meeting at a particular location on Tuesdays; a device location check-in may be indicative of the user going to a church on Sundays (e.g., the user may check-in through a social network); a connectivity state, such as Wi-Fi connectivity, may indicate that the user is at home with friends or family, in the office with coworkers, or at a coffee shop with friends or family; a charging state, such as a car charging state, may indicate that the user is currently driving as part of a regular carpool with friends or coworkers; a vacation itinerary file on the device may indicate that the user will be going on a vacation in a week with a group of friends or family; etc.).

It may be appreciated that, in some aspects, a wide variety of information, such as temporal information and/or locational information, may be evaluated to identify whether the user is with a group of other users and what type of data the group of users may be sharing (e.g., a user's primary calendar may be used to identify meetings, events, or activities; information from the user's social media accounts, family or friends social media accounts, email, news, and other user data (e.g. crowd-sourced data) may indicate when or where the user will be in a group setting or what type of data the group is likely to share).

Application data can include information about the applications the user is interacting with or has open. When available, information received from or input to the various applications can also be included in the application data. The application data may indicate users that are participating in a group or what type of data the group is likely to share. For example, the application data can include a list of media that is available for the group to consume, such as presentations, pictures, videos, songs, or other types of files.

Search data can include information entered into a search query of a publicly available search engine. The results and interaction with those results can also be included in the search data. The search data can also include information requested through a search function integrated into a user device. A personal assistant is one example of an application that has search functionality. In such a case, requests made of a personal assistant and answers provided in response to those requests could be included within the search data. The search data may indicate users that are participating in a group or what type of data the group is likely to share.

Browsing data includes information about webpages the user navigated to through one or more browser applications. In this sense, the browsing data is a special case of the application data.

Purchase data could reflect purchases made to applications or through one or more webpages. In one instance, the application is a credit card or other payment application associated with the client device. For example, some client devices include technology that allows people to pay for goods or services using the client device. The purchase data may help identify which users are in a group (e.g., users that are buying the same item in the same location) or the type of data the group may be interested in sharing.

The device data 207, 218 includes contextual information about the device state and provides this information or makes the information available to the group manager 220. The device data 207, 218 can include which communication connections are currently active or available. Exemplary communication connections include Wi-Fi connections, Bluetooth connections, 3G, 4G, LTE, and other cellular connections. Various wired connections, such as Ethernet connection, could be detected.

Device data 207, 218 may also include battery level data that provides an indication of how much charges left in the battery. The battery level data can also include power usage rates that can indicate how much battery life remains at the current rate of usage. The battery level data can be important constituent for the group manager 220 to determine which device is the hub device 208 or when to replace the hub device 208 with a member device that may have more batter life remaining. For example, if a large amount of battery life remains in the current hub device, then the current hub device may continue operating as the hub device 208. On the other hand, if the current hub device is running low on battery power and a member device has more batter life remaining, then the group manager 220 may replace the current hub device with the member device.

Other device data 207, 218 can include a running total of the user's data quota. The running total can be daily, monthly, weekly, or some other unit. If a current hub device is approaching a user's data quota, then the group manager 220 may replace the current hub device with a member device having more data remaining available.

The group manager 220 can dynamically evaluate the device data 207, 218 to determine which user device is the hub device 208 and which user devices are member devices 202. Various device data can help determine whether computer resources used to communicate user data are currently scarce. Scare resources can include data transfer availability, which can be related to the device's current connections (e.g., Wi-Fi, Ethernet, Data Plan) and power availability (e.g., plugged in or on battery, as well as available battery if on battery power). For example, the device could have unlimited power and unlimited bandwidth because the device is plugged into a power source and connected to a Wi-Fi network that does not have a data quota.

In general, device data 207, 218 can be based on the presence or absence of a data quota and availability of power. On the one end, the device data could indicate unlimited data transfer capability and unlimited power, as mentioned above. On the other end of the spectrum, the context profile could indicate very limited power and limited data transfer. In between, both power and data transfer availability can be measured on a scale. The power availability can be based on battery charge level if the device is not plugged in. The data transfer availability can be measured on a scale based on an amount of data left in the user's data quota. Other factors, such as the amount of active applications, which applications are active, device location, overall device power usage rate, estimated battery life as measured in a unit of time, could in isolation or combination be used to define a device context profile.

In some embodiments, the group manager 220 can provide an interface through which a user can see what types of user data has been shared or will be shared with the group. Although, user data and/or device data may be used to determine the type of data that is being shared, the user can also express preferences regarding what type of data can be shared. The user can also express a preference for one or more user experiences that can be used to determine the various types of user data that will be shared with various groups.

Continuing with FIG. 2, data receiver 214 is generally responsible for accessing or receiving data from one or more data sources, such as data source(s) 216. The data may be received (or accessed) via network 110 and stored at hub device 208 where it may be available to other components of system 200. For example, the hub device 208 may share the data with member device(s) 202 via beacon transmitter 210. Member device(s) receive the data from the hub device 208 via beacon receiver 204. In this way, the member device(s) conserve resources and only the hub device(s) consumes resources to download the data. In some embodiments, any personally identifying data (i.e. data that specifically identifies particular users) is either not shared or otherwise provided from the one or more data sources, not permanently stored, and/or not made available to various services.

Location transmitter 212 of the hub device 208 may be utilized to provide location information to data source(s) 216 on behalf of member device(s) 202. In this way, rather than constantly providing location information to various services, member device(s) 202 are able to conserve resources and rely on the location information communicated by hub device 208. In some embodiments, at least a portion of member device(s) 202 provide location information 206 at least periodically to various services to improve the accuracy of the location information provided by devices in the group.

In some embodiments, more than one device in the group acts as a hub device to increase the speed at which the type of data is downloaded. In some embodiments, a device in the group acts as both a data source and the hub device. In this way, rather than uploading data into a cloud based service for the hub device to download and share with the group, the device acts as the hub device and shares the data directly with the group of devices.

Figure 3:
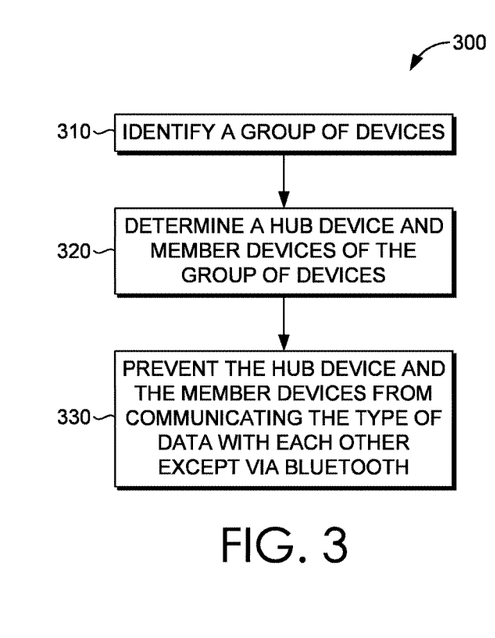
FIGS. 3-4 are flow diagrams showing additional exemplary methods of signal sharing between trusted groups of devices, in accordance with an aspect of the technology described herein.

Turning now to FIG. 3, a method 300 of signal sharing between trusted groups of devices is provided, according to an aspect of the present technology. The method 300 can be performed by a group of devices comprising a hub device and member devices (such as the hub device 112 and member devices 102a-102e described above with respect to FIG. 1) to most efficiently retrieve data from data sources (such as data sources 106a-106n described above with respect to FIG. 1) and preserve limited computing resources, such as available bandwidth and battery power for devices in the group of devices.

At step 310, a group of devices is identified. The group of devices has a communication path that has been initiated by a handshake. In one example, the group of devices may be identified by location signals indicating the devices are moving together or the devices have exceeded a threshold of time being in proximity with each other.

At step 320, a hub device and member devices of the group of devices of the group are determined. In one example, the hub device may be selected (such as by the group manager 108 described above with respect to FIG. 1). In one embodiment, the device may be replaced by one of the member devices if a battery life of the hub device is weaker than the battery life of the member device that is replacing the hub device. In another embodiment, the hub device may be replaced by one of the member devices if a signal strength of the hub device is weaker than the signal strength of the member device that is replacing the hub device.

At step 330, the hub device and the member devices are prevented from communicating a type of data with each other except via Bluetooth. A definition of the type of data each device in the group is sharing may be received. In some embodiments, the type of data each device in the group of devices is sharing is defined by a social graph, location signals, a calendar entry, an event, or a user signal. In this way, the type of data is the only data that is shared between the devices in the group of devices.

Figure 4:
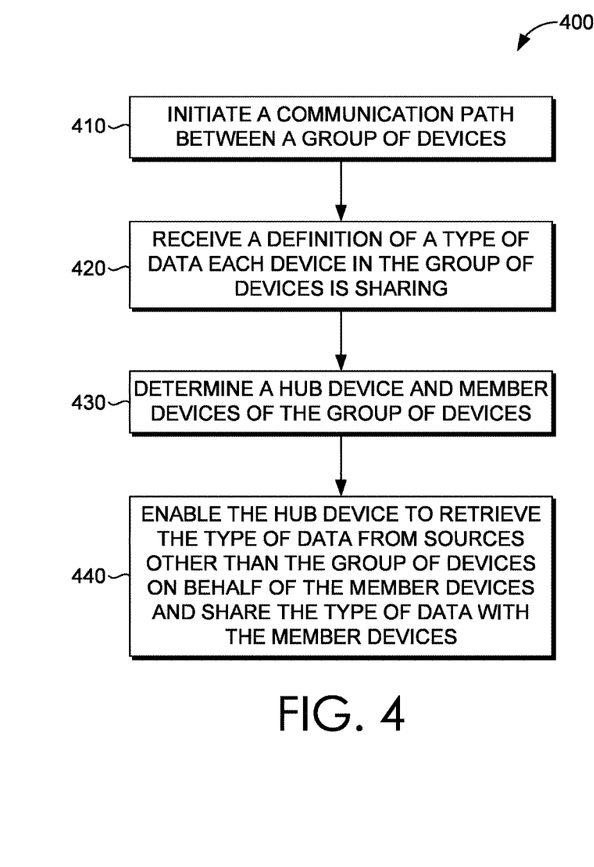

Turning now to FIG. 4, a method 400 of signal sharing between trusted groups of devices is provided, according to an aspect of the present technology. The method 400 can be performed by a group of devices comprising a hub device and member devices (such as the hub device 112 and member devices 102a-102e described above with respect to FIG. 1) to most efficiently retrieve data from data sources (such as data sources 106a-106n described above with respect to FIG. 1) and preserve limited computing resources, such as available bandwidth and battery power for devices in the group of devices.

At step 410, a communication path is initiated between a group of devices identified by location signals or communications between users of devices in the group of devices. The communication path is initiated by a handshake that is provided by beacons corresponding to each device of the group of devices or by a personal assistant service running on each device of the group of devices.

At step 420, a definition of a type of data each device in the group of devices is sharing is received. The type of data is defined by a social graph, locations signals, a calendar entry, an event, or a user signal and being the only data shared between the group of devices.

At step 430, a hub device and member devices of the group of devices are determined. The hub device is a device of the group of devices with the highest remaining battery life, the best signal strength, or a combination thereof.

At step 440, the hub device is enabled to retrieve the type of data from sources other than the group of devices on behalf of the member devices and share the type of data with the member devices.

Exemplary Operating Environment

Figure 5:
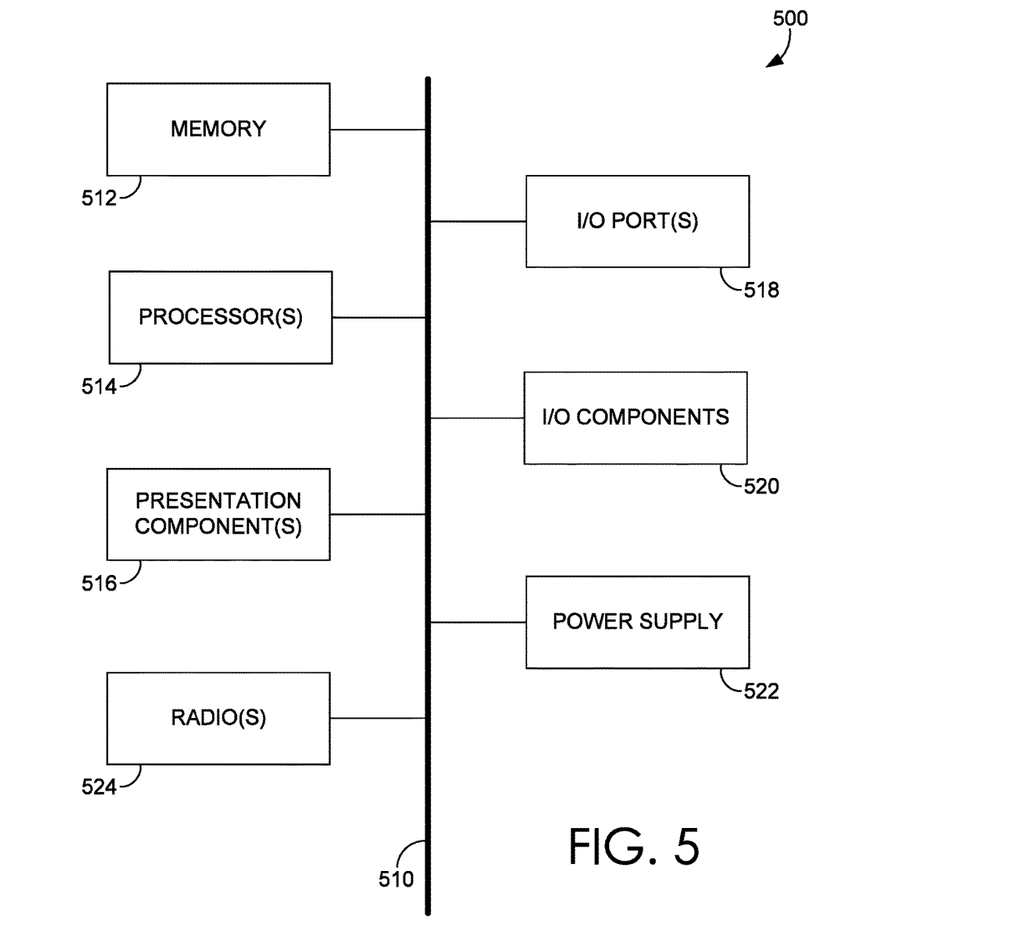
FIG. 5 is a block diagram of an exemplary computing environment suitable for use in implementing aspects of the technology described herein.

Referring to the drawings in general, and initially to FIG. 5 in particular, an exemplary operating environment for implementing aspects of the technology described herein is shown and designated generally as computing device 500. Computing device 500 is but one example of a suitable computing environment and is not intended to suggest any limitation as to the scope of use of the technology described herein. Neither should the computing device 500 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 5, computing device 500 includes a bus 510 that directly or indirectly couples the following devices: memory 512, one or more processors 514, one or more presentation components 516, input/output (I/O) ports 518, I/O components 520, and an illustrative power supply 522. Bus 510 represents what may be one or more busses (such as an address bus, data bus, or a combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 512 includes computer storage media in the form of volatile and/or nonvolatile memory. The memory 512 may be removable, non-removable, or a combination thereof. Exemplary memory includes solid-state memory, hard drives, optical-disc drives, etc. Computing device 500 includes one or more processors 514 that read data from various entities such as bus 510, memory 512, or I/O components 520. Presentation component(s) 516 present data indications to a user or other device. Exemplary presentation components 516 include a display device, speaker, printing component, vibrating component, etc. I/O ports 518 allow computing device 500 to be logically coupled to other devices, including I/O components 520, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 514 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 500. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

A computing device may include a radio 524. The radio 524 transmits and receives radio communications. The computing device may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. A computing system comprising:
a processor;
computer storage memory having computer-executable instructions stored thereon which, when executed by the processor, configure the computing system to:
identify a group of devices, the group of devices having a communication path initiated by a handshake;
receive a definition of a type of data each device in the group of devices is sharing, the type of data being the only data shared between the devices in the group of devices;
determine a hub device and member devices of the group of devices;
enable the hub device to retrieve the type of data from sources other than the group of devices on behalf of the member devices; and
enable the hub device to share the type of data with the member devices via Bluetooth.

2. The system of claim 1 further comprising preventing the member devices from communicating the type of data with each other and the hub device except via Bluetooth.

3. The system of claim 1, further comprising preventing the member devices from communicating location data with external devices.

4. The system of claim 1, further comprising enabling the hub device to communicate location data with external devices on behalf of the member devices.

5. The system of claim 1, wherein the handshake is provided by beacons corresponding to each device of the group of devices.

6. The system of claim 5, wherein the handshake is provided by a personal assistant service running on each device of the group of devices.

7. The system of claim 1, wherein the group of devices is identified by location signals indicating the devices are moving together.

8. The system of claim 1, wherein the group of devices is identified by location signals indicating the devices have exceeded a threshold of time of being in proximity to each other.

9. The system of claim 1, wherein the group of devices is identified by communications between users of the devices, the communications including electronic mail messages, meeting invitations or requests, or calendar data.

10. The system of claim 9, wherein the type of data each device in the group of devices is sharing is defined by a social graph, location signals, a calendar entry, an event, or a user signal.

11. The system of claim 1, further comprising replacing the hub device with one of the member devices and demoting the hub device to a member device.

12. The system of claim 11, wherein the replacing and demoting is based on an indication that a battery life of the hub device is weaker than the battery life of the member device that is replacing the hub device.

13. The system of claim 11, wherein the replacing and demoting is based on an indication that a signal strength of the hub device is weaker than the signal strength of the member device that is replacing the hub device.

14. A method of signal sharing between trusted groups of devices, the method comprising:
by way of a group manager comprising one or more processors:
identifying a group of devices, the group of devices having a communication path initiated by a handshake;
determining a hub device and member devices of the group of devices; and
preventing the hub device and the member devices from communicating a type of data with each other except via Bluetooth.

15. The method of claim 14, further comprising receiving a definition of the type of data each device in the group of devices is sharing, the type of data being the only data shared between the devices in the group of devices.

16. The method of claim 15, wherein the type of data each device in the group of devices is sharing is defined by a social graph, location signals, a calendar entry, an event, or a user signal.

17. The method of claim 14, wherein the group of devices is identified by location signals indicating the devices are moving together or the devices have exceeded a threshold of time of being in proximity with each other.

18. The method of claim 14, wherein the hub device is replaced by one of the member devices if a battery life of the hub device is weaker than the battery life of the member device that is replacing the hub device.

19. The method of claim 14, wherein the hub device is replaced by one of the member devices if a signal strength of the hub device is weaker than the signal strength of the member device that is replacing the hub device.

20. One or more computer-storage media comprising computer-implemented instructions that when executed by a computer processor cause a computer to perform a method of signal sharing between trusted groups of devices comprising:
initiate a communication path between a group of devices identified by location signals or communications between users of devices in the group of devices, the communication path initiated by a handshake that is provided by beacons corresponding to each device of the group of devices or by a personal assistant service running on each device of the group of devices;
receive a definition of a type of data each device in the group of devices is sharing, the type of data defined by a social graph, locations signals, a calendar entry, an event, or a user signal and being the only data shared between the group of devices;
determine a hub device and member devices of the group of devices, the hub device being a device of the group of devices with the highest remaining battery life, the best signal strength, or a combination thereof;
enable the hub device to retrieve the type of data from sources other than the group of devices on behalf of the member devices and share the type of data with the member devices.

* * * * *